Sept. 26, 1961 E. N. CZIK 3,001,485
CHANGEABLE COOKIE FORMERS
Filed April 7, 1960 2 Sheets-Sheet 1

INVENTOR.
EMANUEL CZIK
BY
ATTORNEY

Sept. 26, 1961 E. N. CZIK 3,001,485
CHANGEABLE COOKIE FORMERS
Filed April 7, 1960 2 Sheets-Sheet 2
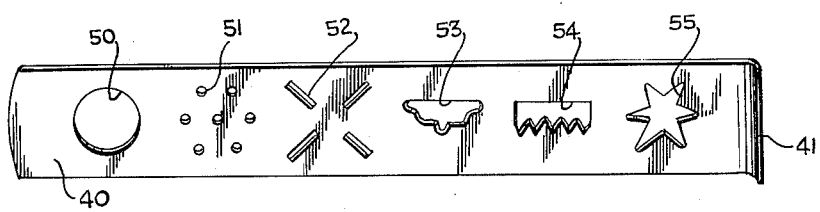
*Fig. 3.*
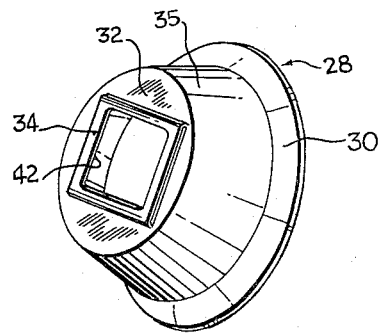 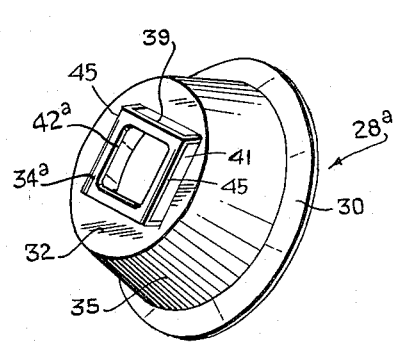
*Fig. 4.* *Fig. 5.*
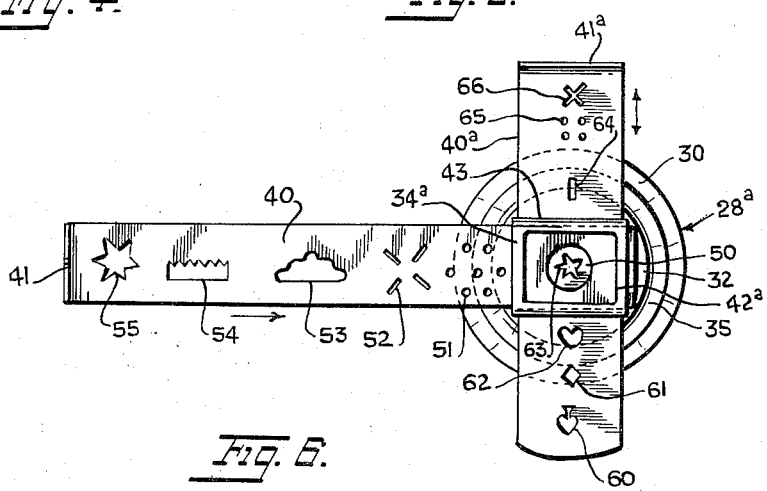
*Fig. 6.*
INVENTOR.
EMANUEL CZIK
BY
ATTORNEY

United States Patent Office 3,001,485
Patented Sept. 26, 1961

3,001,485
CHANGEABLE COOKIE FORMERS
Emanuel N. Czik, 85—39 66th St., Rego Park,
Long Island, N.Y.
Filed Apr. 7, 1960, Ser. No. 20,594
2 Claims. (Cl. 107—14)

This invention concerns an adapter for converting a meat grinding machine to form cookie and pastry dough mixtures.

The general object of the invention is to provide a structure removably mountable on the head of a meat grinder and having a slide member formed with a variety of apertures of different shape selectable at will for extrusion of a rod of dough in selected form.

Another object is to provide an apertured, flanged slide holder mountable behind the usual threaded cap ring of a head of a food grinder, the slide being a strip formed with a plurality of apertures of different shape.

Still another object is to provide a slide holder of the type described, the slide holder being adapted to slidably support a plurality of apertured slides in parallel disposition so that the shape of the aperture through which dough is extruded is variable at will.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 3 is a perspective view of an apertured slide.

FIG. 4 is a perspective view of a slide holder.

FIG. 5 is a perspective view of another slide holder.

FIG. 6 is a front elevational view of the slider holder of FIG. 5 with a pair of apertured slides mounted therein.

Figure 1:
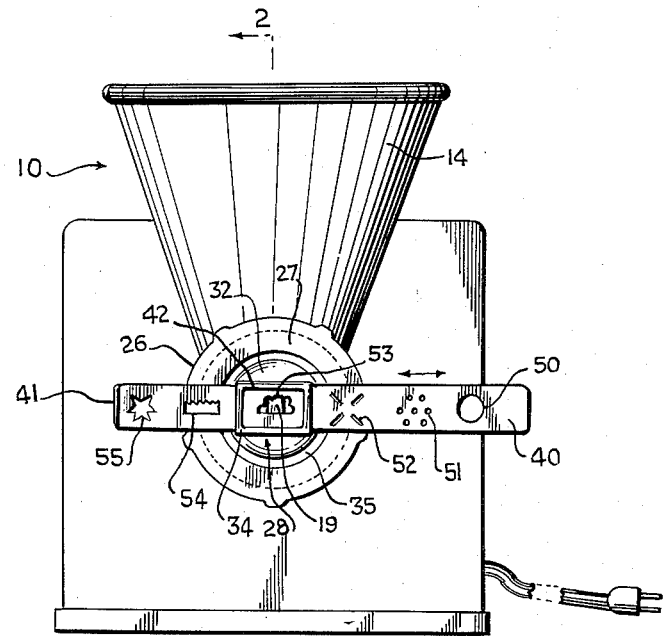
FIG. 1 is a front elevational view of a food grinder embodying the invention.
Figure 2:
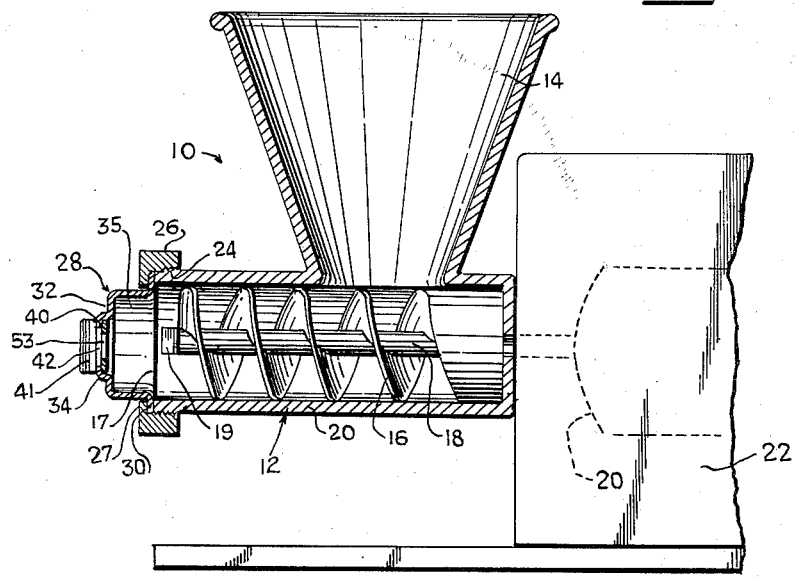
FIG. 2 is a sectional view taken on line 2—2 of FIG. 1.

In FIGS. 1 and 2, there is shown a food grinder 10 having a tubular head 12 provided with an upper conical hopper 14. Rotatably mounted in the head is a helical augur blade 16 having a shaft 18 driven by a motor 20 in the motor housing 22. Mounted on the front open end 17 of the head and engaged on threads 24 thereat is a flanged cap ring 26. The shaft 18 extends forwardly of blade 16 terminating just short of the open front end 17 of the head. The front end 19 of the shaft is adapted to retain a knife which may be mounted on the shaft when it is desired to convert the food grinder for operation in conventional manner to grind foods of various types. To the extent described the food grinder is conventional.

A cup-shaped slide holder 28 having a radially outwardly extending annular flange 30 as best shown in FIG. 4 is removably supported by cap ring 26. The flange 30 is engaged behind the radially inwardly extending annular flange 27 of the ring between flange 27 and the front end 17 of the head 12. Slide holder 28 has a flat forward end 32 formed with a pressed out rectangular frame portion 34 spaced from the end 32 to define a space for receiving a flat slide 40. The spacing of the frame portion 34 from end 32 is substantialy equal to the thickness of the slide 40 so that the slide fits snugly in the holder but is frictionally movable therein. The holder has a forwardly tapered conical wall 35 spacing the end 32 from flange 30. A substantially rectangular aperture 42 is formed in the holder frame portion 34.

The slide 40, as best shown in FIGS. 1 and 3, is a flat rectangular strip of metal or plastic formed with a plurality of apertures 50–55 of different shape. Any one of these apertures can be disposed at aperture 42 in the holder to be framed by portion 34. Aperture 53 is shown so disposed in FIG. 1. The slide has a bent end 41 serving as a handle.

In operation, the augur blade 16 will be driven by motor 20 to force dough fed into hopper 14 through the head and out through one of selected apertures 50–55 in the slide 40. The extruded rod of dough will have a shape in cross section identical with that of the aperture in the slide. The extruded rod of dough can be cut transversely to form cookies, pastries, macaronies, etc., of the desired shape.

In the form of the invention shown in FIGS. 5 and 6, the slide holder 28$^a$ has forward frame portion 34$^a$ U-shaped in configuration formed with a pair of opposed openings 39 in the side walls 43 thereof. The frame portion has an aperture 42$^a$ in the base thereof and has a pair of opposed slots 41 in the leg portions 45 thereof. The slots 39 receive another slide 40$^a$ in crossed disposition with respect to slide 40 in slots 41. Slide 40$^a$ may have another series of apertures 60–66 which can be disposed to modify the shape of any of apertures 50–55 of slide 40 which may be disposed in the holder. The forward frame portion 34$^a$ will be spaced from the forward end of the holder a distance equal to the combined thicknesses of slides 40 and 40$^a$ so that the slides overlay each other in frictional engagement in the holder as shown in FIG. 6. Slide 40$^a$ has a handle 41$^a$ to facilitate movement of the slide. Apertures 60–66 will modify the shape of any of apertures 50–55 exposed at opening 42$^a$ in frame portion 34$^a$.

The slides 40, 40$^a$ and holders 28, 28$^a$ are preferably formed of stainless steel or plastic so as to resist corrosion and to be readily washed and sterilized.

If it is desired to convert the food grinder to use in grinding foods such as fruits, nut meats, etc., the ring 26 will be unscrewed from the head to release the slide holder and a suitable knife (not shown) will be mounted on end 19 of the shaft in conventional fashion. The usual screen (not shown) will be mounted behind the cap ring to coact with the knife. Reconversion back to the arrangement shown in FIGS. 1 and 2 is effected equally rapidly and easily for extruding dough.

The invention has been explained with reference to a motor driven food grinder. The invention is of course applicable to a manually operated crank driven food grinder for ordinary household use. The invention makes it possible for a baker or housewife to fashion cookies, pastries, macaronies, confections and other foods in different novel forms at will. The invention makes it possible to change the shape of the extruded rod of dough during the course of extrusion of a single hopper load of dough so that the use of a variety of cookie formers heretofore required for this purpose is no longer necessary. The single slide strip replaces a plurality of cookie, confection and macaroni presses. Cookies in unlimited number may be produced as dough is continuously fed into the hopper and the cookies can be cut into any desired thickness instead of being limited to the thickness of a sheet of cookie dough as has been the situation heretofore.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A device for forming dough comprising, a food grinder having a tubular head, dough driving means in the head, a flanged cap ring removably mounted on an open end of the head, a cup-shaped slide holder having an annular flange engaged between the ring and said end of the head, said holder having a flat forward end, a U-shaped frame portion supported on the center of said flat forward end, said frame portion having a pair of slots in the side walls thereof and having a pair of slots in the leg portions thereof, the base portion of said frame portion having a central aperture, a flat slide having a plurality of longitudinally spaced apertures of different shape slidably disposed in the slots in the leg portions of the U-shaped frame portion, and another apertured slide disposed in crossed disposition to the first-named slide and inserted through the side wall slots to modify the shape of the aperture in the base portion through which dough is extruded.

2. A device for extruding dough, adapted for coaction with a food grinder having a tubular head, dough driving means in the head and a flanged cap ring removably mounted on the end of the head, comprising a cup-shaped slide holder having an annular flange for engagement between the cap ring and the end of the head, said holder having a flat forward end, a U-shaped frame portion supported on the center of said flat forward end, said frame portion having a pair of slots in the side walls thereof and having a pair of slots in the leg portions thereof, the base portion of said frame portion having a central aperture, a flat slide having a plurality of longitudinally spaced apertures of different shape slidably disposed in the slots in the leg portions of the U-shaped frame portion, and another apertured slide disposed in crossed disposition to the first-named slide and inserted through the side wall slots to modify the shape of the aperture in the base portion through which dough is extruded, said other apertured slide having a plurality of apertures of different shape longitudinally spaced therein.

References Cited in the file of this patent
UNITED STATES PATENTS

| | | |
|---|---|---|
| 822,101 | Copleston | May 29, 1906 |
| 2,070,096 | Smith | Feb. 9, 1937 |
| 2,103,111 | Ekdahl | Dec. 21, 1937 |

FOREIGN PATENTS

| | | |
|---|---|---|
| 175,781 | Austria | Aug. 10, 1953 |